Dec. 16, 1969     E. J. FINOCCHIARO     3,483,894

HIGH PRESSURE PIPE TEST PLUG

Filed April 7, 1966     2 Sheets-Sheet 1

INVENTOR.
EDWARD J. FINOCCHIARO
BY Ernest J Weinberger
ATTORNEYS

United States Patent Office 3,483,894
Patented Dec. 16, 1969

3,483,894
HIGH PRESSURE PIPE TEST PLUG
Edward Joseph Finocchiaro, Newfield, Maine, assignor to the United States of America as represented by the Secretary of the Navy
Filed Apr. 7, 1966, Ser. No. 541,031
Int. Cl. F16l 55/12, 19/02
U.S. Cl. 138—90           1 Claim

ABSTRACT OF THE DISCLOSURE

This invention relates to pipe test plugs and in particular to test plugs employed at extremely high liquid pressures wherein the plug must be secured therein and yet permit the introduction of liquid therethrough at said high pressures. Essentially these plugs serve to confine within a pipe, liquid which is fed into the pipe via the plug itself.

---

The invention described herein may be manufactured and used by or for the Government of the United States of America for governmental purposes without the payment of any royalties thereon or therefor.

With advent of special requirements and liquid hydraulic systems using extremely high pressures it has become necessary to provide valves capable of sustained operation under these conditions. Coexistent therewith is the necessity to provide a means or system for testing such valves and other components. Presently available test plugs have been found lacking in several respects with lack of adequate sealing leading the list. In addition these plugs present a safety hazard as well as being quite large and difficult to both install and remove. These plugs should, in most cases, be capable of withstanding pressure conditions in excess of those for which the valves or other components to be tested are designed.

The test plug should also be usable by those unskilled in the art without requiring either any special tools or rigid complex instructions. Further for the safety of the operator and for most purposes it is desirable to make the plug difficult to remove while it is subjected to some high pressure.

In accordance therewith it is an object of this invention to provide a simple, reliable and inexpensive pipe plug which is useable under extremely high pressures while providing a safe and easily operable seal.

It is another object to provide a test plug whose design may be readily applied to various size pipes and openings and which is reusable or whose sealing component may be simply replaced without the exercise of skill.

Other objects and advantages will appear from the following description of an example of the invention, and the novel features will be particularly pointed out in the appended claim.

Figure 1:
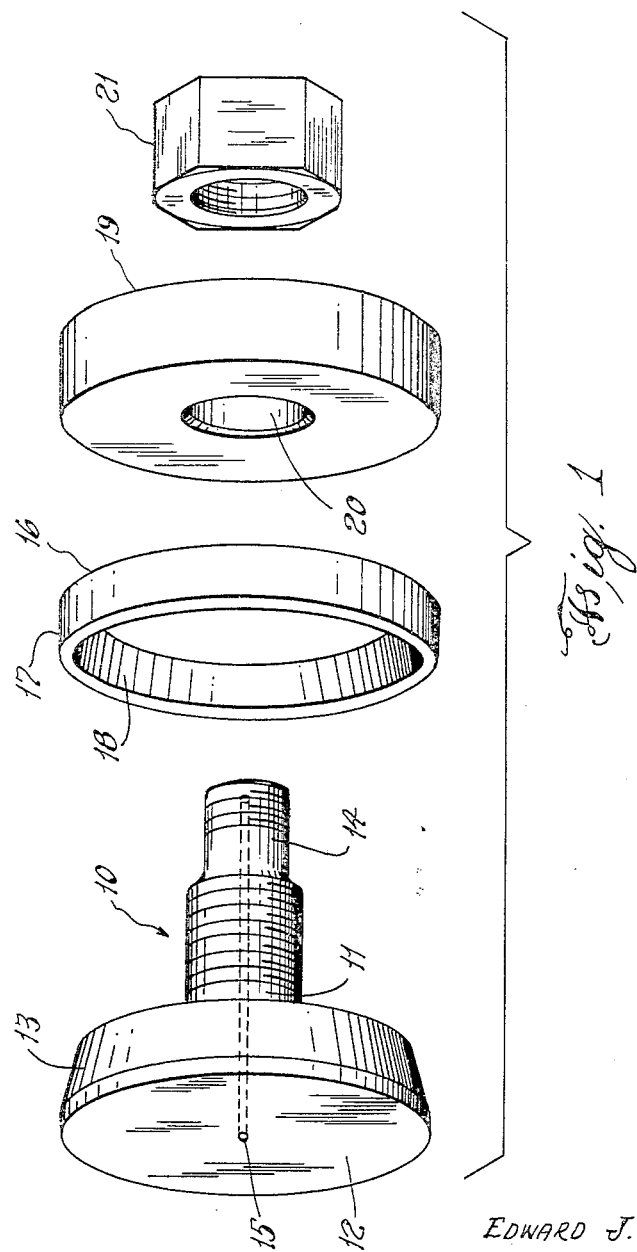
Figure 2:
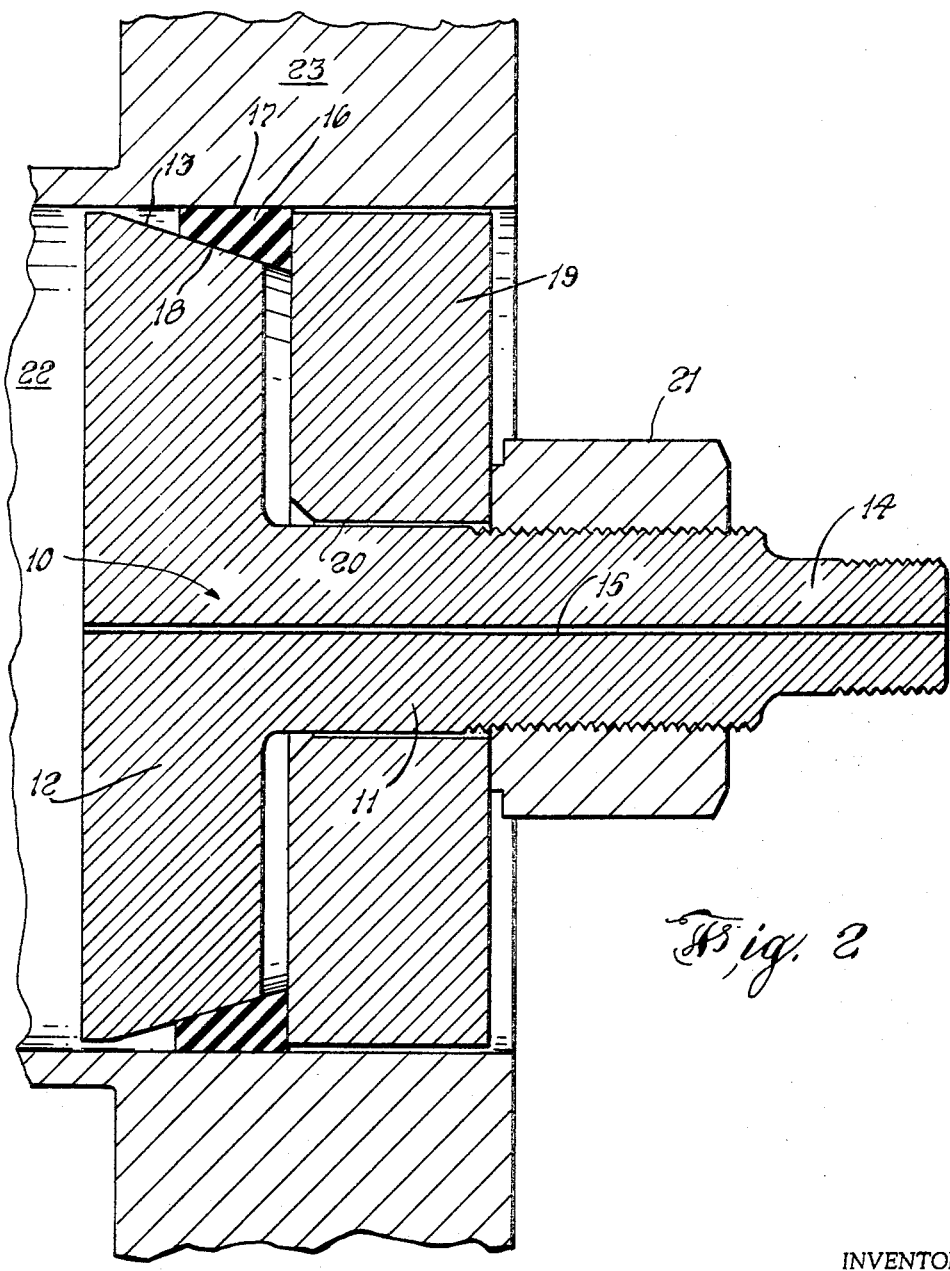

In the accompanying drawing:

FIG. 1 is a disassembled perspective view of the components of an embodiment made in accordance with the principles of this invention; and FIG. 2 is a cross-sectional view of an assembled test plug made in accordance with this invention sealing an opening.

In the embodiment of the invention illustrated in FIG. 1 there is shown a mandrel member or plug body 10 which comprises a central cylinder 11, an operating frusto-conical plate 12 having its peripheral edge 13 of progressively reduced diameter extending rearwardly toward a coupling connector 14 disposed at the opposite end of the cylinder 11. The mandrel 10 is provided with a small central opening 15 which extends longitudinally therethrough and aligned with the passageway or bore of the coupling 14. An annular sealing ring 16 which has a generally cylindrical outer surface 17 and an inner inwardly directed wedge face 18 which is complementary to the face edge 13 of plate 12, is composed of a relatively hard rubber like material. A number of commonly available materials to suit the purposes thereof can be readily obtained as well as the individual components thereof which may be compounded by those skilled in the art. Extremely satisfactory results have been attained with rubber material having a Shore A Durometer Hardness of approximately 90 as determined by the methods as set forth by the American Society for Testing Materials and having a wedge angle α approximately 15°.

A number of commercially available materials have been employed or found to be suitable. Generically they fall with the class of synthetic rubbers known as Buna-N or more recently as Perbunan. An assortment of such rubbers are manufactured by various companies. The following is a list of some of these synthetic rubbers which are butadiene-acrylonitrile copolymers:

"Chemigum" Rubbers—trade name of Good Year Tire and Rubber Company.

"Hycar" and "Ameripol" which is the trade name for finished rubber products made from Hycar by the B. F. Goodrich Company.

These materials in addition to a high degree of resistance to various solvents also exhibit a high tensile strength, excellent resistance to abrasion and very good aging characteristics under severe operating conditions.

The back-up member 19 is provided with a central bore 20 through which the central cylinder 11 of the plug body may pass and which is slidable thereover. The central cylinder 11 is provided with external threads proximate its rear end portion over which is threaded tightening nut 21. All the components are or may be of metallic material or some other suitable material provided it is capable of withstanding the high pressures involved and is of sufficient rigidity.

Referring now to the illustration of FIG. 2, the test plug is shown fully assembled and in operating position. In general these types of test plugs are employed at the ends of pipe sections which are to be tested for their pressure capabilities. Where tests are to be performed on the seal vales of a submarine the outer passageway 22 is sealed across the ship's hull 23. The test plug is assembled with the wedge face 18 of the ring 16 in sliding contact with the plate peripheral edge 13 and the back-up member 19 disposed coaxially with the cylindrical portion 11 of the body 10 and nut 21 adjacent thereto. The plug may be readily inserted into the hull opening since the diameters of the back-up member 19 and the operating plate 12 are smaller than that of the hull opening. The plug is inserted to close the opening immediately across the hull since a considerable force will be exerted radially by the sail 16 against the wall which it abuts. When the plug is employed in a pipe caution should be exercised to insure that the pipe walls are not distorted thereby or they should be provided with a strength member about the plug engaging portion.

With the plug inserted as shown, the nut 21 need be only hand tightened and then the high pressure liquid applied from some source through the coupling 14 via passageway 15 into the chamber formed between the plug and a valve (not shown) at the opposite end thereof. The pressure of the liquid is applied against the forward face 24 of plate 12 and since the surface area thereof is large, a considerable force is exerted by peripheral edge 13 against the face 18 of the sail 16. Seal 16 is effectively compressed between the edge 13 and the inner wall of the pipe or the opening in the hull so as to form a seal therebetween which is directly caused by and proportional to the liquid pressure. The back-up member 19 prevents or limits the rearward movement of the seal due to the possible separation between the plate 12 and the back-up member 19. The frictional force generated between the seal face 17 and the wall 23 is sufficient generally to prevent displacement of the seal while allowing sliding contact between face 13 of the plate and 18 of the seal. It should be noted that with a passageway 15 of the plug which is extremely small as compared to the overall face or surface of the plate, the entire pressure of the liquid is converted into the force which bears and acts upon the seal. Likewise by removing or relieving the liquid presure the plug may be readily removed. Clearly the plug, unless the seal has been damaged, is reusable and the plug can be fabricated in various sizes to accommodate a variety of pipes and openings.

It will be understood that various changes in the details, materials, and arrangements of parts (and steps), which have been herein described and illustrated in order to explain the nature of the invention, may be made by those skilled in the art within the principle and scope of the invention as expressed in the appended claim.

I claim:
1. A high pressure test pipe plug assembly comprising:
   a mandrel body member having a forward plate portion, a central cylindrical threaded portion of reduced diameter, an end coupling portion, and having a central bore extending lengthwise therethrough,
   said plate portion having a frusto-conical peripheral edge converging at an angle of approximately 15 degrees in a direction toward said end portion forming thereby a plate wedging surface,
   an annular elastic sealing member of a copolymer of butadiene-acrylonitrile and having a Shore A Durometer Hardness of approximately 90, having an inner wedging surface, said sealing member disposed peripherally about said plate portion, and said wedging surfaces in abutting contact,
   a back-up member having a central aperture and disposed coaxially about said central portion and slidable freely lengthwise therealong, said back-up being spaced from said plate portion and abutting said sealing member,
   a tightening member disposed about said central portion intermediate said back-up member and said end portion,
   whereby when said assembly is inserted into a pipe opening and said tightening member made to bear against said back-up member and liquid introduced through said bore and confined in said pipe said plug will seal said pipe.

References Cited

UNITED STATES PATENTS

| | | | |
|---|---|---|---|
| 521,835 | 6/1894 | Tillinghast | 138—90 |
| 610,452 | 9/1898 | Loeble et al. | 138—90 |
| 1,644,118 | 10/1927 | Florence | 138—90 |
| 2,374,947 | 5/1945 | Nicholson | 138—90 |
| 2,527,874 | 10/1950 | Bradley | 138—90 XR |
| 2,855,003 | 10/1958 | Thaxton | 138—90 |
| 2,870,794 | 1/1959 | Thaxton | 138—90 |
| 2,974,685 | 3/1961 | Ver Nooy | 138—90 |
| 3,006,680 | 10/1961 | Gregory | 138—90 XR |

LAVERNE D. GEIGER, Primary Examiner

HENRY K. ARTIS, Assistant Examiner